US006871953B1

(12) United States Patent
Mandell et al.

(10) Patent No.: US 6,871,953 B1
(45) Date of Patent: Mar. 29, 2005

(54) CONTACT LENS WITH TRANSITION

(75) Inventors: Robert B. Mandell, Moraga, CA (US); Charles E. Campbell, Berkeley, CA (US)

(73) Assignee: SoftFocal Company, Inc., Moraga, CA (US)

( * ) Notice: Subject to any disclaimer, the term of this patent is extended or adjusted under 35 U.S.C. 154(b) by 21 days.

(21) Appl. No.: 10/675,510

(22) Filed: Sep. 29, 2003

(51) Int. Cl.⁷ .............................. G02C 7/04; A61F 2/16
(52) U.S. Cl. ..................... 351/161; 351/177; 623/6.24; 623/6.27
(58) Field of Search ................... 351/160 R, 160 H, 351/161, 162, 177; 623/6.24, 6.27

(56) References Cited

U.S. PATENT DOCUMENTS

| | | | |
|---|---|---|---|
| 3,597,055 A | 8/1971 | Neefe | 351/161 |
| 3,684,357 A | 8/1972 | Tsuetaki | 351/161 |
| 4,095,878 A | 6/1978 | Fanti | 351/161 |
| 4,268,133 A | 5/1981 | Fischer | 351/161 |
| 4,549,794 A | 10/1985 | Loshaek | 351/161 |
| 4,573,775 A | 3/1986 | Bayshore | 351/161 |
| 4,614,413 A | 9/1986 | Obssuth | 351/161 |
| 4,618,229 A | 10/1986 | Jacobstein | 351/161 |
| 4,636,049 A | 1/1987 | Blaker | 351/161 |
| 4,752,123 A | 6/1988 | Blaker | 351/161 |
| 4,850,689 A | 7/1989 | Martin | 351/161 |
| 4,854,089 A | 8/1989 | Morales | 51/284 |
| 4,869,587 A | 9/1989 | Breger | 351/161 |
| 5,074,082 A | 12/1991 | Cappelli | 51/284 |
| 5,192,318 A * | 3/1993 | Schneider et al. | 623/6.28 |
| 5,245,366 A | 9/1993 | Svochak | 351/161 |
| 5,296,880 A | 3/1994 | Webb | 351/161 |
| 5,366,500 A * | 11/1994 | Schneider et al. | 623/6.28 |
| 5,430,504 A | 7/1995 | Muckenhirn | 351/161 |
| 5,483,304 A * | 1/1996 | Porat | 351/161 |
| 5,517,260 A | 5/1996 | Glady | 351/169 |
| 5,635,998 A | 6/1997 | Baugh | 351/161 |
| 5,754,270 A | 5/1998 | Rehse | 351/161 |
| 5,760,870 A | 6/1998 | Payor | 351/160 |
| 5,864,379 A | 1/1999 | Dunn | 351/161 |
| 5,912,719 A | 6/1999 | Baude | 351/160 R |
| 6,109,749 A | 8/2000 | Bernstein | 351/161 |

FOREIGN PATENT DOCUMENTS

EP   0042023   12/1981

OTHER PUBLICATIONS

Bierly, J. R. et al, "A quantitative and qualitative assessment of the solitaire bifocal contact lens", CLAO journal, 21(1):1995, pp. 20–23.

(Continued)

*Primary Examiner*—Scott J. Sugarman

(57) ABSTRACT

A monocentric bifocal contact lens with upper and lower optical power zones is connected by a transition comprising a family of sigmoidal curves. The sigmoidal curve begins with a common tangent at the boundary of the near zone and, with a reversal of sign from the near zone curve, climbs with increasing positive slope to an inflection point, whereupon it continues to climb with decreasing positive slope until reaching the distance zone curve, with which it has a common tangent. There is no discontinuity in the first derivative of the curve throughout its length. A sigmoidal curve can be constructed from numerous mathematical functions, examples of which include polynomial, conic, transendental, or cumulative distribution curves.

18 Claims, 7 Drawing Sheets

OTHER PUBLICATIONS

Burris, G.M., "Presbyopic retrospective: a ten-year study", Spectrum, Apr., 1993, pp. 56–59.

Conklin, J.D. et al, "An evaluation of four multifocal contact lenses in young monocular aphakic patients", CLAO Journal, 18(2):1994, pp. 92–94.

Mandell, R., *Contact Lens Practice,* 4th ed. Springfield, C. Thomas, 1988, pp. 809–814.

Norman, C.W. and Lotzkat, U., "A soft approach to presbyopia", Spectrum, Aug. 1995, pp. 27–32.

Forst, B. "Investigations into the stabilization of bifocal contact lenses", Int. Contact Lens Clinic, 14(2):1987, pp. 68–74.

Rubens, M. and Guillon, M. *Contact Lens Practice,* Chapman and Hall Medical, London, 1994, pp. 811–822.

Mandell, R.B. Optom. Weekly, 1967 pp., 19–21.

Mandell, R.B. Int. Contact Lens Clin., 1974 pp. 87–99.

Ezekiel, D.F. Contact Lens Spectrum, 2002, pp 40–42.

* cited by examiner

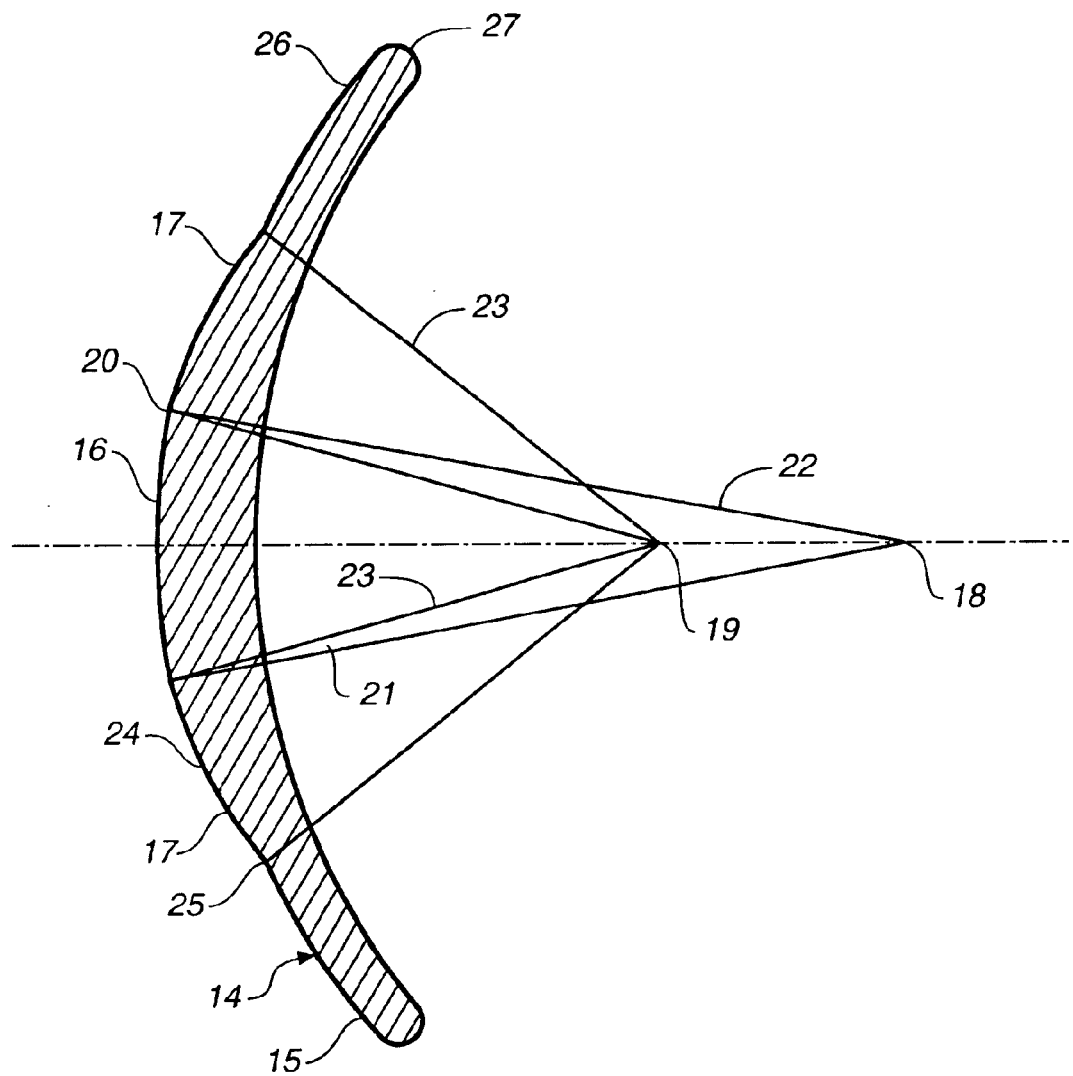
FIG._1(PRIOR ART)

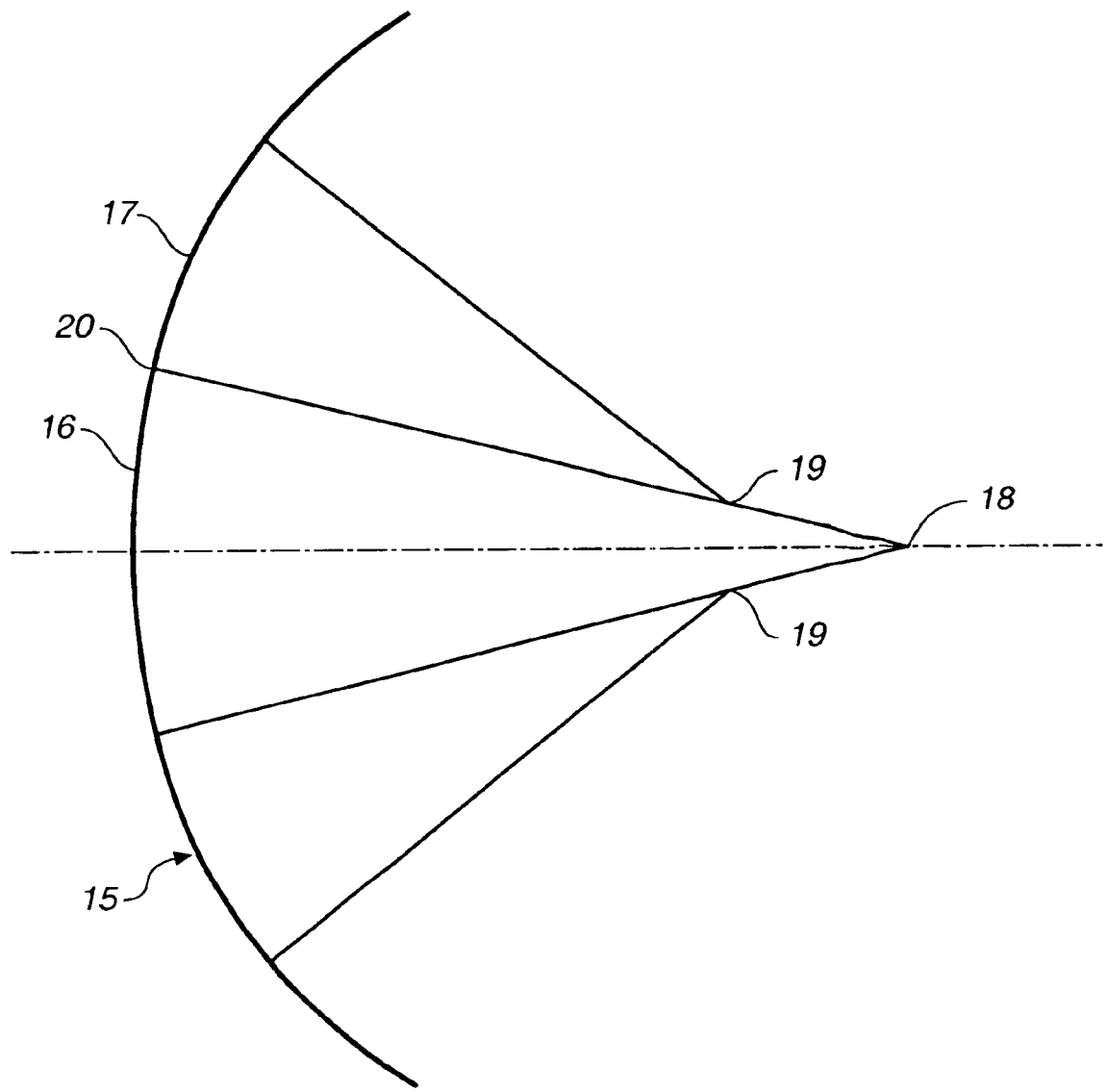
FIG._2 (PRIOR ART)

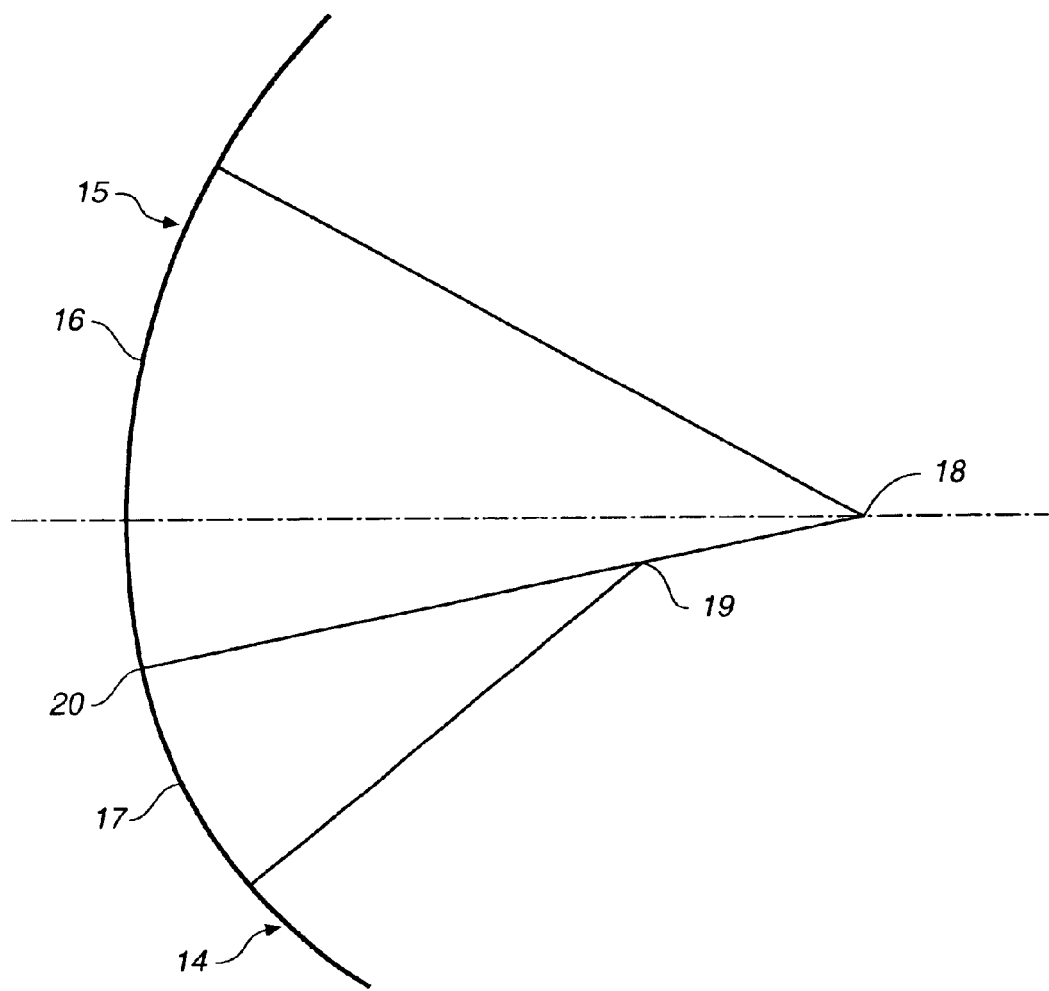
FIG._3 (PRIOR ART)

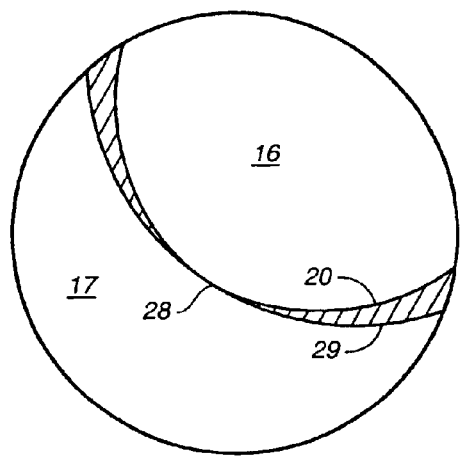
FIG._4(PRIOR ART)
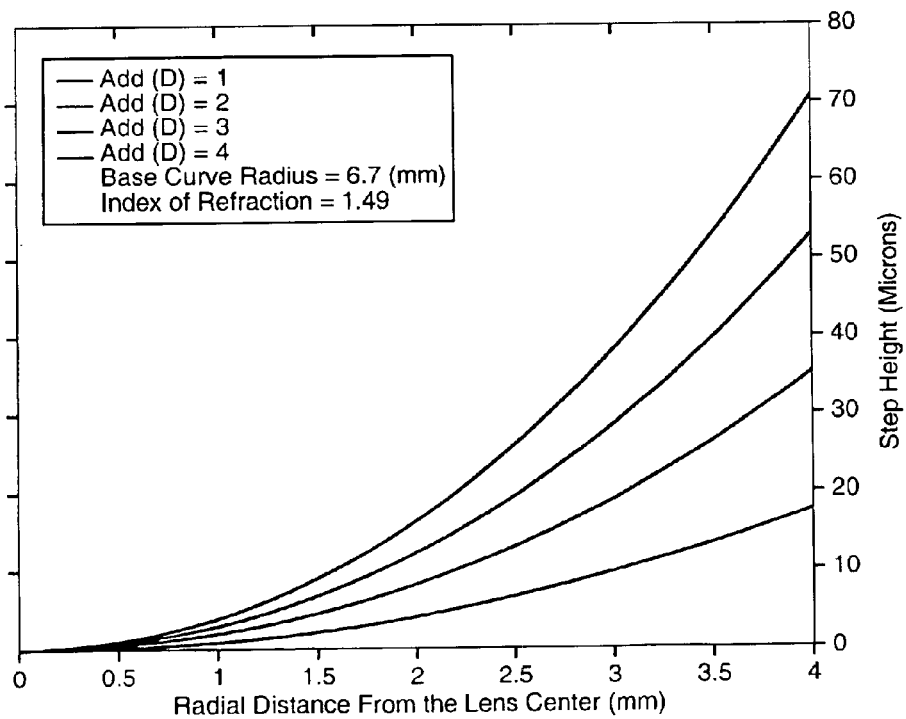
FIG._5

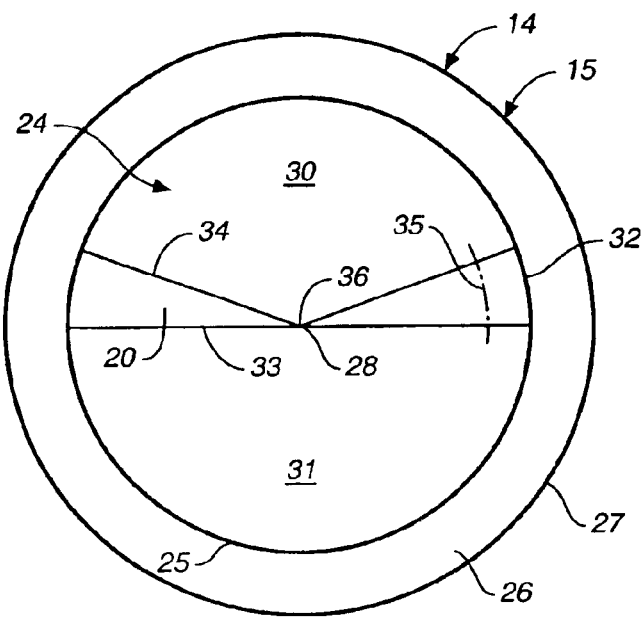
FIG._6
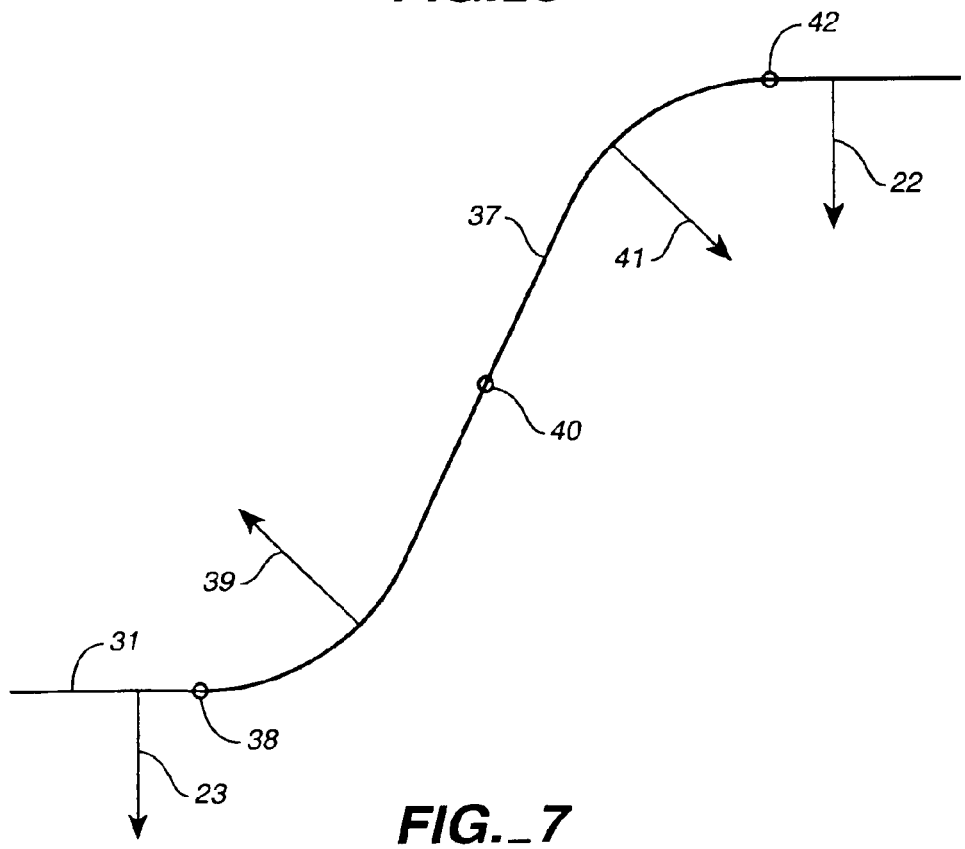
FIG._7

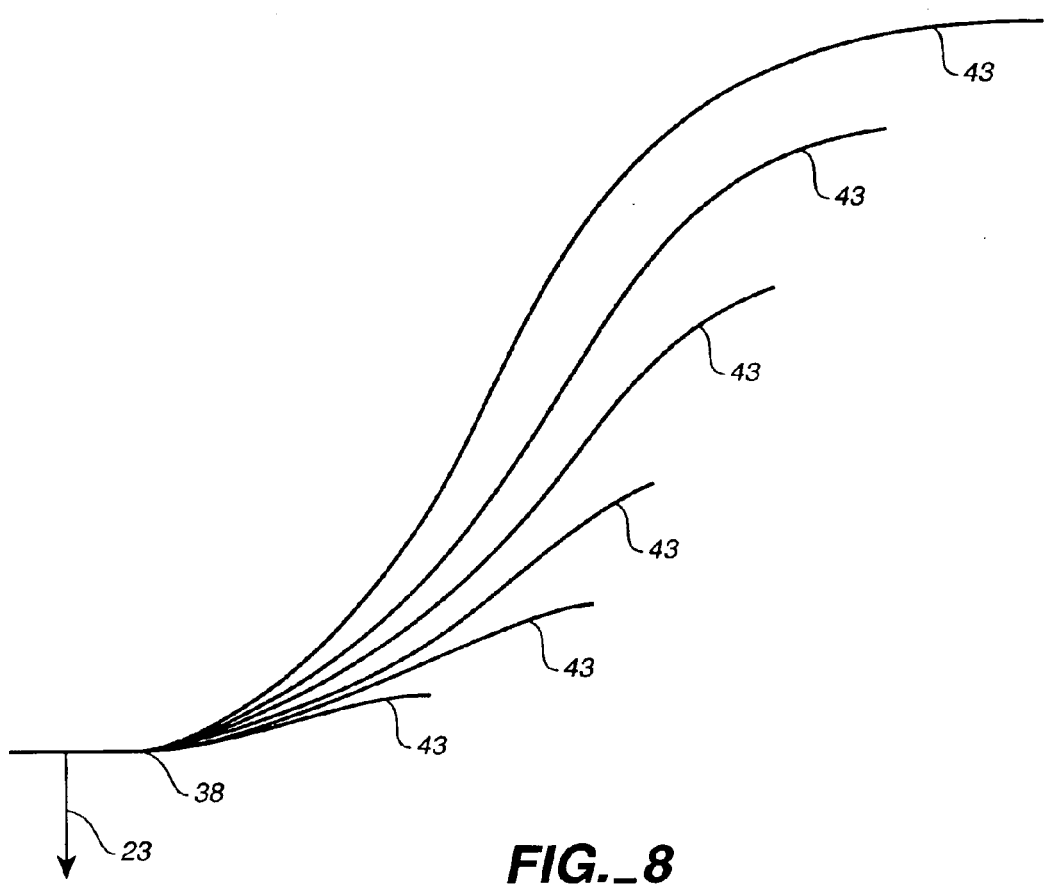
FIG._8

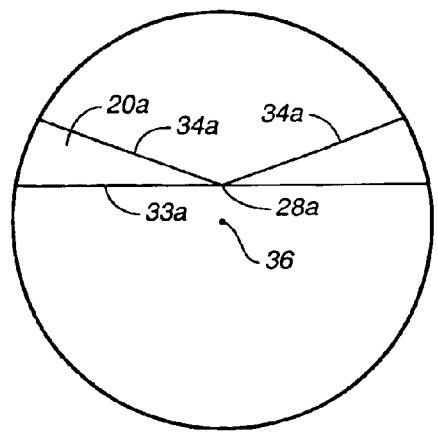
FIG._9
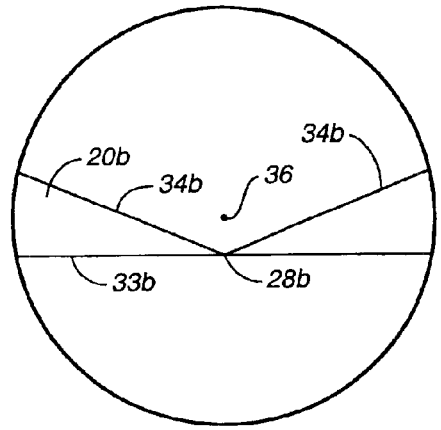
FIG._10
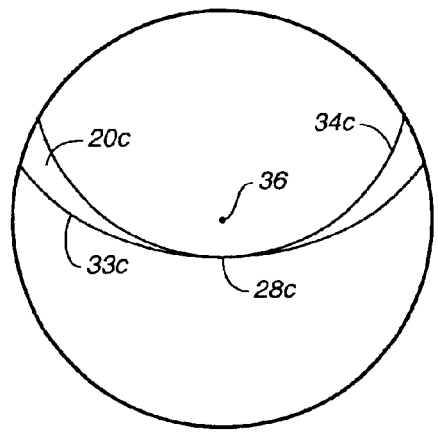
FIG._11
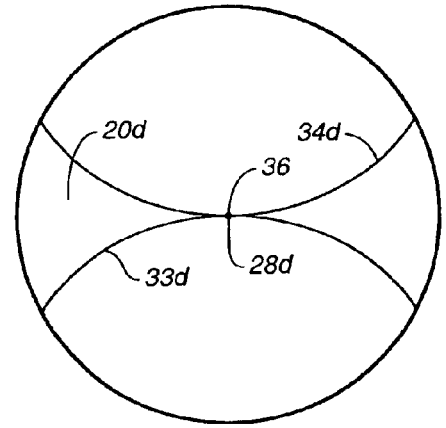
FIG._12
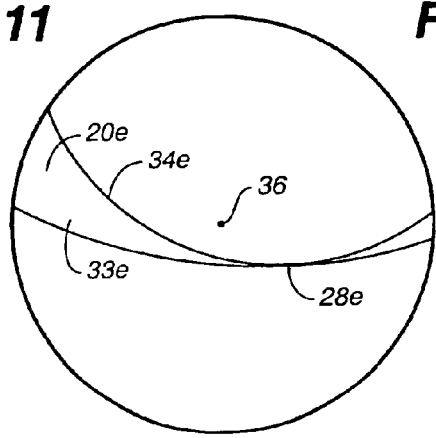
FIG._13

CONTACT LENS WITH TRANSITION

BACKGROUND OF THE INVENTION

1. Field

This invention relates to bifocal contact lenses and bifocal intraocular lenses with upper and lower optical power zones.

2. Prior Art

Bifocal contact lenses are lenses with at least two regions of different optical powers, known as zones or segments. Usually, one power is chosen to provide the wearer with clear distance vision and the second power to provide clear near vision, but any two powers may be selected. Bifocal contact lenses also may be called multifocal contact lenses, although the latter term is sometimes reserved for lenses comprised of at least three regions with different optical powers or regions of variable power, as in U.S. Pat. Nos. 5,517,260 (Glady) and 5,754,270 (Rehse.) Bifocal contact lenses have some features in common with bifocal intraocular lenses and some differences.

Bifocal contact lenses generally are classified into two types, concentric and vertically segmented. Both types can be produced as rigid or soft contact lenses.

Concentric bifocal contact lenses have a central power zone surrounded by one or more annular zones of different powers or a sequence of alternating powers. Generally, the lens is designed so as to have little motion on the eye and the wearer views through portions of more than one zone at the same time, a process called simultaneous vision, as described in U.S. Pat. Nos. 4,636,049 (Blacker); 4,752,123 (Blacker); 4,869,587 (Breger); and 5,864,379 (Dunn). The distance and near zones, together with optional transition curves, comprise the bifocal area. The peripheral portion of the lens is comprised of one or more curves that are used to connect the bifocal area to the edge perimeter, including options currently in use such as prism ballast, slab-off, tapers, peripheral curves, lenticular curves, truncations and.

Vertically segmented bifocal contact lenses have vertically separated power zones, an upper zone that usually provides the appropriate correction for viewing far distances and a lower zone, which usually provides the appropriate correction for viewing near distances. The lenses are designed to alternate their position in front of the pupil when the lens moves up and down on the eye as the result of lid forces, which occur when the wearer changes gaze between different distances, a process called alternating vision, as described in U.S. Pat. Nos. 3,597,055 (Neefe) and 3,684,357 (Tsuetaki). If there is little vertical movement then vertically segmented bifocal contact lenses may also function as a simultaneous vision lens.

The two vertically separated power zones maintain their relative positions by various features that can be added to control the lens position and stabilize the meridional rotation as described in U.S. Pat. Nos. 4,095,878 (Fanfi); 4,268,133 (Fischer); 5,760,870 (Payor); 5,296,880 (Webb); and 4,573,775 (Bayshore). This is commonly accomplished in rigid bifocal contact lenses by incorporating a prism into the lens, which provides a progressively greater thickness from the top to the bottom of the lens. The prism serves to maintain the desired lens orientation and keep the lower zone of the lens downward on the eye as described in U.S. Pat. Nos. 5,430,504 (Muckenhirn) and 4,854,089 (morales) and in Burris, 1993; Bierly, 1995, and Conklin Jr. et al, 1992. The lower edge of the lens is designed to rest upon the lower lid margin of the wearer and the lens shifts up and down relative to the eye as the result of lid forces. There are several subtypes of vertically segmented bifocal contact lenses, based on the shape of the near zone, including round, D-shaped, flat, crescent, and others as described by Conklin Jr. et al, 1992 and in U.S. Pat. No. 4,618,229 (Jacobstein) and U.S. Pat. No. 5,074,082 (Cappelli).

There have been attempts to incorporate prism into soft bifocal contact lenses for the same functional purpose as prism provides for rigid lenses. U.S. Pat. Nos. 4,549,794 (Loshaek); 5,635,998 (Baugh); 4,618,229 (Jacobstein) Ezekiel, 2002, but generally these lenses have inadequate lens movement or produce discomfort to the wearer. There also have been attempts to induce a vertical shift of a soft bifocal contact lens by adding features to the lower periphery of the lens, as described in U.S. Pats. 4,614,413 (Obssuth); 5,635,998 (Baugh); 6,109,749 (Bernstein): 5,912,719; and European Pat. EP0042023 (Muller).

A more successful soft bifocal contact lens design (U.S. patent application Ser. No. 09/908,296 (Mandell)) contains at least two prisms. A primary prism controls lens positioning and meridional orientation, while a secondary prism controls lens movement.

Transition

The power zones of a bifocal contact lens contain different surface curvatures, which are linked together by a transition. The transition may have zero or finite width and may vary in design, depending upon how the adjacent power zones are oriented with respect to each other.

If a bifocal contact lens has a transition of zero width and there is a change in slope of the adjacent zones at their junction, the transition will appear as a line when viewing the front surface of the lens as shown in U.S. Pat. No. 4,752,123 (Blacker). If there is no change in slope, the transition will appear smooth and will not be detectable by surface inspection.

Concentric bifocal contact lenses are available with a greater variety of transition designs than are found in vertically segmented lenses. An example is shown in FIG. 1, which illustrates the midline cross-section construction of a prior-art concentric bifocal contact lens 14. On a front surface 15 a distance power zone 16 is located in the center of the lens and a near power zone 17 surrounds the distance zone in a concentric arrangement. A center of curvature for the distance zone 18 and another for near zone 19 lie on a common axis of symmetry, so that at a transition 20 between the zones there is not only a change in curvature, but also a change in slope that is equal to an angle 21 between a radius for the distance power zone 22 and a radius for the near power zone 23. The front surface 15 of lens 14 has a visible transition line in the shape of an arc of a circle. Distance zone 16 and near zone 17 comprise a bifocal area 24, limited by a bifocal perimeter 25, which is surrounded by a peripheral zone 26 that extends to an edge perimeter 27.

FIG. 2 shows another example of a prior-art concentric bifocal contact lens front surface, which has center of curvature 19 for near zone 17 that occurs on lines connecting center of curvature 18 for distance zone 16 and transition 20. There is no slope change at transition 20 and there is no visible transition line when viewing the front of the lens. However, in three dimensions the center of curvature for the near segment is a locus of points that form a circle and the near zone is part of a torus, rather than a sphere. If the radius of the torus increases towards the periphery, near zone 17 is an aspheric curve. This arrangement can be used to connect a spherical distance zone to an aspherical near zone with no slope change at the transition. In a similar manner various combinations of spherical and aspherical curves can be combined to produce a variety of concentric bifocal designs having no slope change at the transition. A front view of the surface any of these of lenses does not show a visible transition.

There are several design options currently available for the transition of bifocal contact lenses with vertically segmented zones. One design is a front surface bifocal in which the center of curvature of the near zone is displaced upward with respect to the distance zone. This creates a transition in which the two adjacent zones join together at the same height, relative to the back surface, but with an instantaneous change in slope as revealed in U.S. Pat. No. 4,854,089 ((Morales). A front view of such a lens appears as a line that is arc shaped, concave upward.

Unfortunately, an abrupt change in slope at the transition between two adjacent power zones is accompanied by a prismatic optical difference, which causes the wearer of the contact lens to observe a change in the image position when his gaze is shifted between the distance and near zones, a phenomenon known as image jump. Most contact lens wearers find that image jump is disturbing and generally poorly tolerated. Furthermore, if the lens assumes a position on the eye such that the transition lies in front of the pupil, the prismatic difference of light passing into the eye simultaneously from both the distance and near zones will cause the wearer to experience image doubling, which is intolerable to the lens wearer.

In another prior-art bifocal contact lens design, image jump and doubling were avoided by making the bifocal contact lens monocentric.(R Mandell, 1967,1974, 1988) A monocentric bifocal lens is a lens that has no prismatic difference between the power zones at the transition (FIG. 3). Monocentricity can be produced on front surface 15 of bifocal contact lens 14 by locating center of curvature 18 for distance zone 16 and center of curvature 19 for near zone 17 on a common line that also passes through transition 20. Unfortunately, the optical advantage of monocentricity is accompanied by a physical limitation.

FIG. 4 shows how the two power zones of FIG. 3 can be made to coincide at a midpoint 28 of transition 20 but they do not coincide at peripheral points 29 on transition 20 due to the difference in curvature of the zones. The height of distance zone 16 along transition 20 increases towards the periphery relative to the height of near zone 17. Consequently there is a step up in height in passing from the near to the distance zone and the step increases towards the lens periphery. When the lens is worm, the transition step interrupts the smooth flow of the lid across the lens during blinking.

FIG. 5 shows the magnitude of the step height for a range of moncentric bifocal contact lens parameters. The step height increases with the power of the bifocal add as well as from the midpoint to the periphery of the transition. For example, given an add power of 3.00 diopters and an optic zone diameter of 8 mm the step height would range from zero at the midpoint to 0.052 mm in the periphery. Typical maximum values for step heights of bifocal adds between 1.00 and 4.00 diopters would range from about 0.02 to 0.07 mm.

The step height of the transition can be changed by a modification of the monocentric bifocal design. For example, the centers of curvature for the distance and near zones can fall on a common line with the transition, but the distance zone is displaced inwardly at the midpoint of the transition. A step down occurs from the near to the distance zone at the midpoint of the transition. The two zones have the same height at two points along the transition in the periphery, as in U.S. Pat. No. 4,549,794 (Loshaek).

Another option for the design of a moncentric bifocal contact lens is intermediate to the other two designs. The distance and near zones are positioned such that there is a step inward near the midpoint of the transition that is less than the step in Option 2. The step decreases towards the periphery until at some intermediate position on the transition there is no step, followed at more peripheral locations by a step outward that would increase towards the periphery.

In theory the step that occurs at the transition of the monocentric bifocal of FIG. 4 consists of an abrupt increase in height, which can be represented by a square wave function. The surface of the near zone reaches the transition and then an instantaneous height increase occurs in passing to the distance zone as shown in U.S. Pat. No. 5,245,366 (Svochak). In practice, a square wave function is not produced on the lens because of the constraints of manufacturing. For example, in using a standard lathe to manufacture the monocentric bifocal contact of FIG. 4, the entire surface of the lens is first generated using the radius of the distance zone. Then, the cutting tool is adjusted for the near radius and the center of rotation is offset to fall on the line connecting the centers of curvature for the distance zone and the transition point. Next the near zone is generated up to the transition, at which position the curvature of the cutting tool will be imparted into the portion of the near zone that is adjacent to the distance zone. The impression made by the cutting tool becomes the transition curve of the lens. The mathematical function that represents the transition shape is determined by the shape of the tool. Since the cutting edge of the tool is a convex circle or asphere, the transition that is formed will be a concave negative replica of the cutting tool.

Generally it is found that most cutting tools used in the manufacture of contact lenses have a radius of curvature at the cutting edge that is between 0.1 and 0.6 mm. Therefore, it is this same radius that will be found in negative form on the transition of the lens that is manufactured. The result is fortuitous because the curvature of the transition is more gradual than would be the case were an actual square wave function created. The more gradual slope of the transition creates a smoother surface for the lid to pass over and adds to the comfort of the lens when worn. However, a transition created by the shape of the cutting tool is not ideal since it presents abrupt slope changes in passing from the transition to the power zones. In addition, the width of the transition, and hence the rate of change of its slope, is limited by the radius of the lathe cutting tool.

An alternate method of manufacturing a monocentric bifocal contact lens can be achieved by using an oscillating lathe, such as the Precitech Optomform 40 with Variform Generator by Sterling Co. of Tampa, Fla. or DAC Series IV/2 Axis ALM by DAC International of Carpinteria, Calif. This type of lathe can be used to generate two or more zones on the front surface of a monocentric bifocal lens in a single continuous motion by varying the distance of the cutting tool relative to the lens back surface during each rotation of the lathe spindle. The cutting tool moves in and out from the lens surface with each cycle at the same time it traverses from lens edge to center. A problem is presented when the lathe tool passes between the distance and near zones, which are at different heights. The cutting tool cannot make an instantaneous change in height, which would require a square wave motion. Instead, the most efficient transition curve is used that will allow the lathe to change the height of the cutting tool as rapidly as possible. The curve that is usually chosen to do this is based on a sinusoidal function.

This results in a transition curve that is smooth but which has a change in slope at the connections to the adjacent zones. In addition, the curve may not be smooth in a radial direction.

Another attempt was made at smoothing the transition between the distance and near zones of a bifocal contact lens is by using a mechanical device that changes radius of curvature while cutting the transition area, as in U.S. Pat. No. 5,430,504 (Muckenhirn). This device produces a curve for the transition that varies continuously from the radius of the distance zone to the radius of the near zone. This results in a curve instead of a step at the transition, but also produces a line at the boundary between the junction and the distance power zone, where a slope change is evident.

Intraocular (implanted) bifocal lenses are manufactured by essentially the same process as bifocal contact lenses, except for their biconvex shape. In these lenses, if there is a rough or abrupt transition it can cause the accumulation of debris in the, eye and produce adverse reactions. Although an intraocular bifocal lens might have restricted movement the optical advantage of monocentricity would still provide optimal simultaneous vision. The principles of the present invention for bifocal contact lenses would also apply to intraocular lenses.

OBJECTS AND ADVANTAGES

It is accordingly one object of the present invention to provide contact and intraocular lenses that will provide viewing both distance and near objects without image jump and doubling.

A further object of the present invention is to provide a monocentric lens that has a step in height between the power zones of the lens that is not apparent.

Further objects of the present invention are to provide a bifocal contact lens that will give maximum comfort to the wearer, to provide a bifocal contact lens that can be manufactured using standard lathing, oscillating tool lathing or molding techniques, to expand the number of patients who are able to wear bifocal contact lenses, and to provide a bifocal lens that gives optimal vision for both distance and near vision without image jump or doubling.

Another advantage is to provide a contact lens that has a bifocal surface that is smooth and free of sudden height steps that may interrupt the smooth flow of the lid across the lens during blinking.

Further objects and advantages of the present invention will become apparent from a consideration of the drawings and ensuing description.

SUMMARY

According to the present invention, monocentric bifocal contact lenses and intraocular lenses with upper and lower optical power zones are connected by a transition comprising a family of sigmoidal curves. The ends of the sigmoidal curves have common tangents with the curves of the adjacent power zones at their boundaries. Each sigmoidal curve begins with a common tangent at the boundary of the lower zone and climbs with increasing positive slope to an inflection point, whereupon it continues to climb with decreasing positive slope until reaching the upper zone curve, with which it has a common tangent. There is no discontinuity in the first derivative of the curve throughout its length. A sigmoidal curve can be constructed from numerous mathematical functions, examples of which include polynomial, conic, transendental, or cumulative distribution curves. The height of the sigmoidal curve is determined by the step height between the two power zones to be connected. The length of the family of sigmoidal curves is chosen independently and is longer than the narrowest curve that can be produced by the manufacturing process. The sigmoidal curves provide a smooth transition and make the transition less visible.

As the step height of a monocentric bifocal contact lens increases from the midpoint to the periphery of the transition, the sigmoidal curves that form the transition will increase in length and height towards the lens periphery. As a result, the family of sigmoidal curves has smoothness in a radial direction as well as in the direction of the sigmoidal curves.

The general shape of the transition area, as it appears from the front of the lens in isometric projection, can vary widely. In general the transition forms two sectors of the bifocal area, which are usually symmetrical with respect to a midpoint but can be oriented at different angles. The boundaries between the transition and the power zones may be straight or curved and the transition can be decentered along any meridian.

Various combinations of boundary shapes and positions can be created. The parameters that can be used to control the characteristics of the transition are as follows:

1. Midpoint position. Centered or displaced up or down, left or right, or at an angle from the lens geometric center.
2. Radius of the lower boundary of the transition as constructed by orthogonal projection from the front of the lens.
3. Radius of the upper boundary of the transition as constructed by orthogonal projection from the front of the lens.
4. Angle of the transition as measured by its angular subtense from the midpoint of the transition to the edge of the bifocal area.
5. Type of sigmoidal function used to connect the two adjacent power zones.

DRAWINGS

Figures

FIG. 1 is a midline cross-section of a prior-art concentric bifocal contact lens in which a prismatic change occurs at the transition.

FIG. 2 is a midline cross-section of a prior-art concentric bifocal contact lens front surface in which no prismatic change occurs at the transition.

FIG. 3 is a midline cross-section of a prior-art vertically segmented bifocal contact lens front surface in which no prismatic change occurs at the transition, making it monocentric.

FIG. 4 is a perspective view of a prior-art monocentric bifocal contact lens showing the increase in transition step height towards the periphery.

FIG. 5 is a graph of the transition step height as a function of the distance from the transition midpoint, for representative bifocal powers.

FIG. 6 is a plan view of a front surface of one embodiment of a bifocal contact lens, in accordance with the present invention.

FIG. 7 is a representation of a sigmoidal curve used to form the bifocal transition of FIG. 6.

FIG. 8 illustrates the relative relationship of a single sigmoidal curve to the family of sigmoidal curves that form the transition of FIG. 6.

FIG. 9 is a plan view of the bifocal area of FIG. 6, modified so that the lower boundary is straight and the upper boundary is angled upward on each side.

FIG. 10 is a plan view of the bifocal area of FIG. 6, modified so that the lower boundary is straight and the upper boundary is curved upward on each side.

FIG. 11 is a plan view of the bifocal area of FIG. 6, modified so that the lower boundary is curved upward and the upper boundary is curved upward a greater amount than the lower boundary.

FIG. 12 is a plan view of the bifocal area of FIG. 6, modified so that the lower boundary is curved downward and the upper boundary is curved upward.

FIG. 13 is a plan view of the bifocal area of FIG. 6, modified so that the lower boundary is curved downward and the upper boundary is curved less than the lower boundary. The transition midpoint is decentered.

DETAILED DESCRIPTION

FIG. 6 is a plan view of a front surface 15 of a bifocal contact lens 14, in accordance with the invention. Front surface 15 is comprised of bifocal area 24 that is limited by bifocal perimeter 25, and surrounded by peripheral zone 26 that extends to edge perimeter 27. Bifocal area 24 is comprised of an upper zone 30 of an optical power for distance vision and a lower zone 31 of an optical power for near vision, which are connected by transition 20. Transition 20 is comprised of a midpoint 28, a periphery 32, a lower boundary 33 with lower zone 31 and an upper boundary 34 with upper zone 30. Lower boundary 33 follows a straight line in a horizontal orientation and upper boundary 34 follows two straight lines that are angled upward on each side from transition midpoint 28 to transition periphery 32.

A sigmoidal-curve path 35 is represented by an arc that is concentric with midpoint 28 of transition 20. Midpoint 28 of transition 20 coincides with a geometric center 36 of lens 14.

FIG. 7 is a representation of a sigmoidal curve 37, which follows path 35 of transition 20 of FIG. 6. Sigmoidal curve 37 begins at its connection with a positive radius 23 of lower zone 31 with a common tangent at a first inflection point 38, where the radius of curvature is infinity. Sigmoidal curve 37 then becomes a negative radius 39, which decreases radius value as the curve climbs with increasing slope to a second inflection point 40, at which the radius is again infinity. From second inflection point 40 the curve climbs further with decreasing slope and a positive radius 41 which decreases from infinity until it reaches positive radius 22 of upper zone 30 with a common tangent at their connection 42.

FIG. 8 shows the relative relationship of sigmoidal curve 37 of FIG. 7 to the family of sigmoidal curves 43 used to form the increasing width of transition 20 of FIG. 6, from zero at midpoint 29 to a maximum at bifocal perimeter 25.

FIG. 9 is a plan view of bifocal area 24 of FIG. 6 showing transition 20a with lower boundary 33a that is a line in a horizontal orientation and an upper boundary 34a that is a line angled upward on each side from transition midpoint 28a to transition periphery 32a. Transition midpoint 28a is displaced upward from geometric center 36 of bifocal area 24.

FIG. 10 is a plan view of bifocal area 24 of FIG. 6 showing transition 20b with lower boundary 33b that is a straight line in a horizontal orientation and an upper boundary 34b that is concave upward on each side from transition midpoint 29b to transition periphery 32b. Transition midpoint 29b is displaced downward from geometric center 36 of bifocal area 24.

FIG. 11 is a plan view of bifocal area 24 of FIG. 6 showing transition 20c with lower boundary 33c that is a concave upward and an upper boundary 34c that is more concave upward on each side from transition midpoint 28c to transition periphery 32c. Transition midpoint 28c is displaced downward from geometric center 36 of bifocal area 24.

FIG. 12 is a plan view of bifocal area 24 of FIG. 6 showing transition 20d with lower boundary 33d that is concave downward and an upper boundary 34d that is concave upward on each side from transition midpoint 28d to transition periphery 32d.

FIG. 13 is a plan view of bifocal area 24 of FIG. 6 showing transition 20e with lower boundary 33e that is concave downward and an upper boundary 34e that is concave upward on each side from transition midpoint 28e to transition periphery 32e. Transition midpoint 28e is displaced laterally from geometric center 36 of bifocal area 24.

Manufacturing the Lens

The bifocal contact lens can be manufactured using an oscillating lathe with computer controller such as the Precitech Optomform 40 with Variform Generator from Sterling of Tampa, Fla. or DAC Series IV/2 Axis ALM from DAC International of Carpinteria, Calif. This type of lathe is programmed to generate a surface for the lens from a three-dimensional points file or family of curve segments. The file can be based on any mathematical function that fulfills the requirements of a sigmoidal curve.

In order to create the points file, the data specifying the front surface of the sigmoid lens are formed as an array of surface elevation values above a fixed plane transverse to the axial of rotation of the lathe that will form the surface. Instructions to the lathe are best given in its natural coordinate system, a cylindrical coordinate system whose axis of rotation is that of the lathe. In a plane perpendicular to this axis of rotation the discrete data locations form a polar coordinate grid whose radial values are evenly spaced from the center to a value equal to the radius distance from the center to the edge of the lens on meridians that are evenly spaced around the lens. It is convenient to specify 256 radial positions, so that the radial distance to the edge of the lens is divided by 256 to create a radial increment value and this is the distance between data locations from the center to the edge on each meridian. Sufficient data density is created by spacing the meridians 2 degrees apart. This completely specifies the data locations. For ease of calculation, it is better to store these locations in Cartesian form rather than in polar form so each data location pair, $(r,\theta)$ is converted to $(x,y)$ values in standard fashion, i.e.

$x = r \cos(\theta)$ $y = r \sin(\theta)$

The data array itself should be thought of as an array of locations, in a memory file, into which the surface elevation values will be placed, once they are found. Associated with this array are two other arrays called the data position arrays, one labeled the x array and the other labeled the y array. They are the same size as the data array and in each location of the position arrays is placed the position value, either x or y, of the associated elevation value.

The two surfaces may now be combined with a sigmoid transition zone. This is done using a transition mask that takes the value 1 in areas where the full add is wanted and the value 0 were the full distance power is wanted. In between, in a crescent shaped area the mask smoothly changes value following a sigmoid curve from 1 to 0. The mask is multiplied times the value of the distance zone curve minus the near zone curve at each point and then this array of values is subtracted from the distance curve values. This creates a combined power surface with a proper sigmoid transition zone.

The principle of the mask used for this purpose is to create a function that when multiplied times a second function causes that value of the combined function to smoothly change from the value of the first function to zero over some distance at which the mask operates. The logical transition mask has the value 1 at all data locations where it is decided that there is to be no change in the value of the second function. Therefore after the application of the mask via a point by point multiplication of the mask-to the second function, the combined function still equals the first function in this area. Outside the zone in which there is to be no change, the value of the mask changes smoothly in some specified manner until the value of zero is reached at the edge of the transition zone. This causes the value of the combined function, created by multiplying the mask times the second function, to vary in smooth fashion from the value of the second function at the edge of the transition zone to zero at the other edge.

Naturally there are cases in which it is not desired that the combined function goes to zero at the edge of the transition zone and this is accomplished by subtracting from the second function the value desired at the edge of the of the transition zone before applying the mask. Then after applying the mask, the value subtracted is added back to all points. This technique can be used in applying the sigmoid crescent mask.

An alternative method for the manufacture of the lens is to first prepare a mold ether by direct lathing using the method followed for constructing the lens or by molding lens surfaces of the desired shapes. The molds may then be used to form a contact lens of any suitable optical material that can be molded.

Conclusions, Ramifications, and Scope

There are a number of general considerations that apply to the present invention.

A sigmoidal curve is ideal for connecting the height difference between the two adjacent power zones of a monocentric bifocal contact lens. It presents the smoothest transition for the lid to pass over the junction. By choosing a sigmoidal curve function for the transition of a vertically segmented bifocal contact lens that is monocentric, and spreading the transition over a greater area than that created by the cuffing tool shape, it is possible to produce a more comfortable bifocal contact lens than previous designs.

We have found that if the transition zone has a sigmoidal shape, there is no appreciable decrement to the image seen by the contact lens wearer. This occurs because light passing through the transition is dispersed over a wide area and is not perceived as spurious images by the wearer.

The exact shape of the sigmoidal curve can vary over a large range of parameters. Its length will exceed the chord width of the cutting tool surface at the depth used in its construction. The sigmoidal curve need not be symmetric about the inflection point and the inflection point need not be in the center of the curve. The ends of the sigmoidal curve will meet each adjacent zone curve with a common tangency so that there is a perfectly smooth transition. If the sigmoid curve has a slope that is equal to the slope of the curve in the connecting power zone, the connection will be smooth and no line will be apparent when observing from in front of the lens.

The principles of the invention may be applied to a variety of bifocal contact lenses, including those designed for simultaneous or alternating vision.

A curve that is similar to a sigmoid curve can be produced on a vertically segmented bifocal contact of monocentric design by beginning with a lens of the prior art design of FIG. 4 and then polishing the abrupt connection between the transition and each adjacent zone until there appears to be a smooth connecting curve. The procedure would not produce a sigmoid curve and would not have a common tangent with each adjacent zone at its connection. Further, it would not be based on a known mathematical function and would not be reproducible.

In the preceding examples of the present lens, the bifocal portion of the contact lens was placed on the front surface. The back surface of the lens can be designed in a manner so as to fit the cornea of the wearer using methods known to those familiar with the state of the art. Generally, the curvature of the back surface of the contact lens is made very similar to the curvature of the cornea. However, there are purposeful differences made in the lens curvatures from the corneal curvatures, which are governed by the shape of the cornea, the shape of the contact lens and the interrelationship that is desired by the fitter in order to control the lens riding position on the cornea and the lens movement.

The surface of the power zones may be comprised of spherical, toric, or aspherical curvatures.

The transition may extend to the bifocal perimeter or may be connected to the bifocal perimeter by a blending curve or other connecting curve.

The bifocal lens may have one or more non-optical features such as prism ballast, slab-off, tapers, peripheral curves, lenticular curves, truncations and edge contours, as are found in present contact lenses as well as oval or other commonly known perimeter shapes. The edge is the most peripheral contour on the lens and ends at the edge perimeter, which is the most peripheral limit formed by the maximum diameters in all meridians. The peripheral zone may vary in width at different meridians and may not extend around the entire bifocal area.

The principles that are described may be applied to lenses made of any optical material, hard, flexible, soft, hydrophobic or hydrophilic, that is suitable for a lens. The principles of this invention may also be applied to one surface of an intraocular lens in order to eliminate image doubling and to avoid step boundaries, which would otherwise occur and tend to collect intraocular debris and deposits.

Since the bifocal has a smooth surface it is possible to make a contact lens in which the bifocal surface is either on the front surface, back surface, or both surfaces. The lens may be designed for simultaneous or alternating vision.

We claim:

1. A bifocal contact lens formed of at least one optical material and comprising, a back surface of generally concave shape, and a front surface of generally convex shape, said front surface joining said back surface at an edge perimeter, at least one of said surfaces comprising an upper zone of optical power and a lower zone of different optical power, said upper and lower zones connected by a transition, a region between said bifocal area and said edge perimeter comprising a peripheral zone, said upper zone and said lower zone together with said transition comprising a bifocal area that is monocentric, said transition comprising a family of curves with an upper and a lower boundary and having a plurality of sigmoidal shapes, whereby said lens provides a wearer with vision that is free of image jump and allows minimal resistance to lid movement across said lens.

2. The lens of claim 1 in which at least one of said boundaries of said transition forms a straight line in plan view.

3. The lens of claim 1 in which at least one of said boundaries of said transition forms a curved line in plan view.

4. The lens of claim 1 in which a midpoint of said transition extends from a geometric center of said lens to said peripheral zone of said lens.

5. The lens of claim 1 in which said midpoint of said transition extends from a position decentered from said geometric center of said lens to said peripheral zone of said lens.

6. The lens of claim 1 in which at least one surface of said upper and lower power zones is selected from the group consisting of spherical, aspherical and toric surfaces.

7. The lens of claim 1 in which at least one of said front and back surfaces has a set of curvatures that correct for aberrations of the eye.

8. The lens of claim 1 comprising prism power in at least a portion of said lens, in addition to optical power.

9. The lens of claim 1 in which at least one of said optical power zones is comprised of at least two optical power zones to form a multifocal contact lens.

10. The lens of claim 1 whereby said sigmoidal curves are based on conic functions.

11. The lens of claim 1 whereby said sigmoidal curves are based on polynomial functions.

12. The lens of claim 1 whereby said sigmoidal curves are based on transendental functions.

13. The lens of claim 1 whereby said sigmoidal curves are based on cumulative distribution functions.

14. A bifocal contact lens formed of at least one optical material and comprising, a back surface of generally concave shape, a front surface of generally convex shape, said front surface joining said back surface at an edge perimeter, at least one of said surfaces comprising an upper zone of optical power and a lower zone of different optical power, said upper and lower zones connected by a transition, a region between said bifocal area and said edge perimeter comprising a peripheral zone, said upper zone and said lower zone together with said transition comprising a bifocal area that is monocentric, said transition comprising a family of curves with an upper and a lower boundary and slopes that are equal to the slopes of said power zones at said boundary, each curve of said family of curves comprising a portion that rises from its lowest point with increasing positive slope to an inflection point, whereupon said curve continues to rise with decreasing positive slope until reaching its highest point, whereby said lens provides a wearer with vision that is free of image jump and said lens allows minimal resistance to lid movement across said lens.

15. A bifocal contact lens formed of at least one optical material and comprising, a back surface of generally concave shape, a front surface of generally convex shape, said front surface joining said back surface at an edge perimeter, at least one of said surfaces comprising an upper zone of optical power and a lower zone of different optical power, said upper and lower zones connected by a transition, a region between said bifocal area and said edge perimeter comprising a peripheral zone, said upper zone and said lower zone together with said transition comprising a bifocal area that is monocentric, said transition comprising a family of curves which begin at a connection to a positive radius of said lower zone with an inflection, that is followed by a negative radius that increases continuously until reaching a radius of infinity at an inflection of positive slope, which is followed by a positive radius that decreases continuously until reaching said upper zone, where it changes to the radius of the upper zone, whereby said lens provides a wearer with vision that is free of image jump and said lens allows minimal resistance to lid movement across said lens.

16. A bifocal contact lens formed of at least one optical material and comprising, a back surface of generally concave shape, a front surface of generally convex shape, said front surface joining said back surface at an edge perimeter, at least one of said surfaces comprising an upper zone of optical power and a lower zone of different optical power, said upper and lower zones connected by a transition, a region between said bifocal area and said edge perimeter comprising a peripheral zone, said upper zone and said lower zone together with said transition comprising a bifocal area that is monocentric, said transition comprising a plurality of curves of a length that is greater than the chord width of a cutting tool surface at the depth used in cutting said transition, whereby said lens provides a wearer with vision that is free of image jump and said lens allows minimal resistance to lid movement across said lens.

17. A bifocal intraocular lens formed of at least one optical material and comprising, a back surface of optical power, and a front surface of optical power, said front surface joining said back surface at an edge perimeter, at least one of said surfaces comprising an upper zone of optical power and a lower zone of different optical power, said upper and lower zones connected by a transition, said upper zone and said lower zone together with said transition comprising a bifocal area that is monocentric, said region surrounding said bifocal area comprising structures to support said lens in the eye, said transition comprising a family of curves having a plurality of sigmoidal shapes, whereby said lens provides a wearer with vision that is free of image jump and provides a lens with smooth surfaces.

18. A method of manufacturing a monocentric bifocal contact lens in which a computer controlled lathe capable of an oscillating motion of the cutting tool uses a points file to generate the following, a first surface area about a center of curvature that lies on a predetermined position from the axis of a second surface area about a center of curvature which is a greater distance from the spindle axis than is said center of curvature of said first optical power, to form a second optical power zone in the lower portion of said lens, a transition between said zone of said first optical power and said zone of said second optical power which is defined by a sigmoidal function that is selected so as to produce no change in slope where joining surfaces of said zones of optical power, whereby said lens provides a wearer with vision that is free of image jump and said lens allows minimal resistance to lid movement across said lens.

* * * * *

UNITED STATES PATENT AND TRADEMARK OFFICE
CERTIFICATE OF CORRECTION

PATENT NO. : 6,871,953 B1
DATED : March 29, 2005
INVENTOR(S) : Robert B. Mandell and Charles E. Campbell It is certified that error appears in the above-identified patent and that said Letters Patent is hereby corrected as shown below:

Column 1,
Line 6, insert:
-- This invention was made with government support Under Grant 1-R43 EY14286, awarded by the National Institutes of Health. The government has certain rights in the invention. --.

Signed and Sealed this

Twenty-third Day of August, 2005

JON W. DUDAS
*Director of the United States Patent and Trademark Office*